United States Patent [19]

Colomer

[11] 4,157,251
[45] Jun. 5, 1979

[54] SELF-CLEANING FILTER DEVICE
[75] Inventor: Pierre Colomer, Chatenay-Malabry, France
[73] Assignee: Interfiltre, S. A., Livarot, France
[21] Appl. No.: 867,471
[22] Filed: Jan. 6, 1978
[51] Int. Cl.² ............................................. B01D 45/18
[52] U.S. Cl. ...................................... 55/242; 55/230; 55/431
[58] Field of Search .................. 55/242, 294, 230, 96, 55/301, 431, 466; 261/25, 115

[56] References Cited
U.S. PATENT DOCUMENTS

| 1,771,846 | 7/1930 | Goodloe | 55/230 |
| 1,807,950 | 6/1931 | Adams, Jr. et al. | 55/242 X |
| 1,831,782 | 11/1931 | Strindberg | 55/230 X |
| 1,865,245 | 6/1932 | Goodloe | 55/230 X |
| 1,895,618 | 1/1933 | Fedeler | 55/242 X |
| 4,081,255 | 3/1978 | Evans | 55/242 X |

Primary Examiner—Richard L. Chiesa
Attorney, Agent, or Firm—Jay L. Chaskin

[57] ABSTRACT

A self-cleaning filter device comprising a traveller adapted to reciprocate along the filters and carrying spray means oriented to spray cleaning liquid on said filters, wherein the traveller is reciprocated by means of a hydraulic motor which is rotated by the cleaning liquid itself.

6 Claims, 5 Drawing Figures

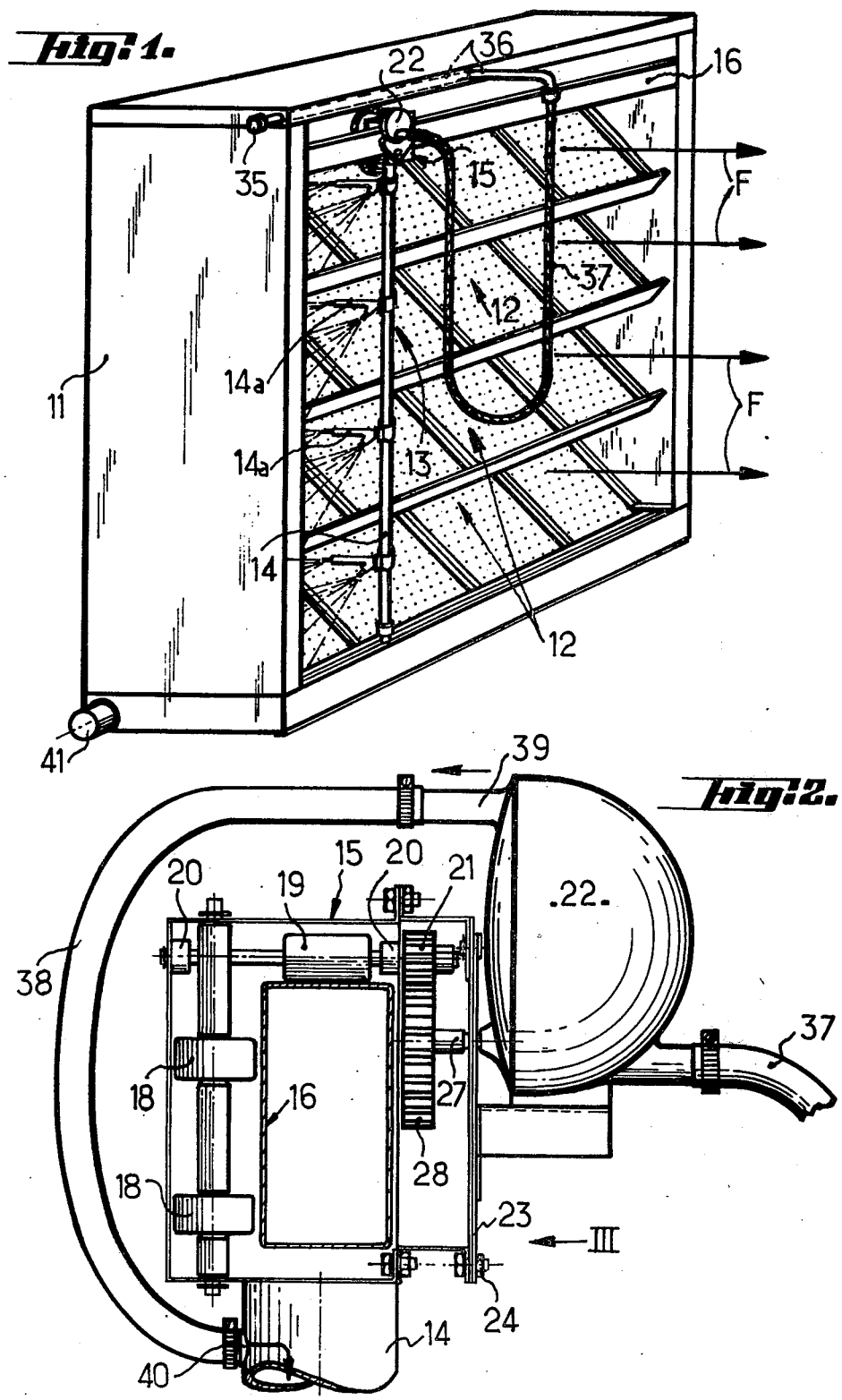

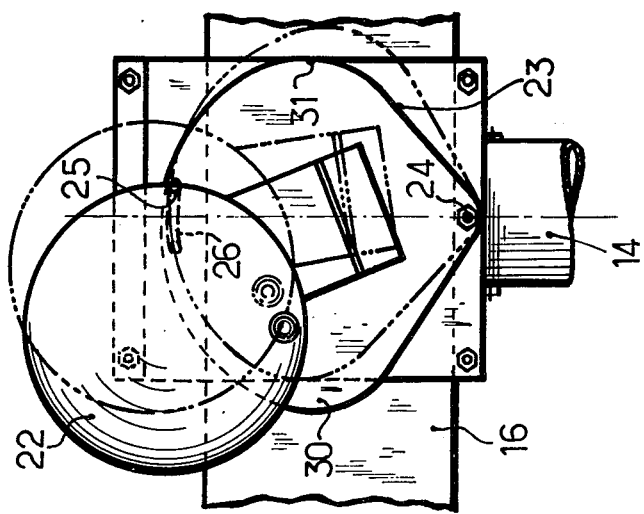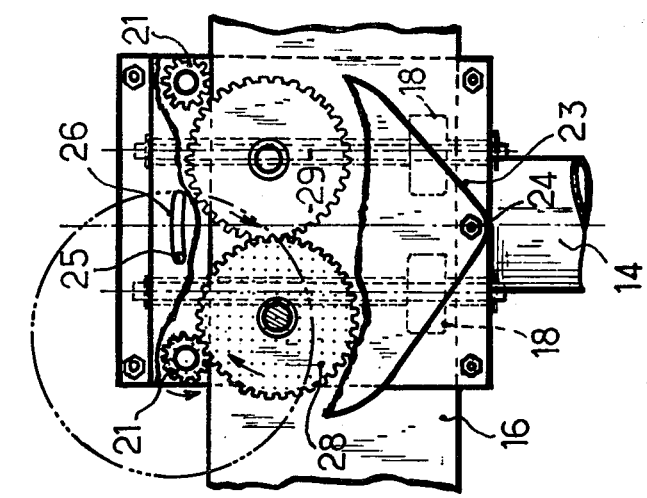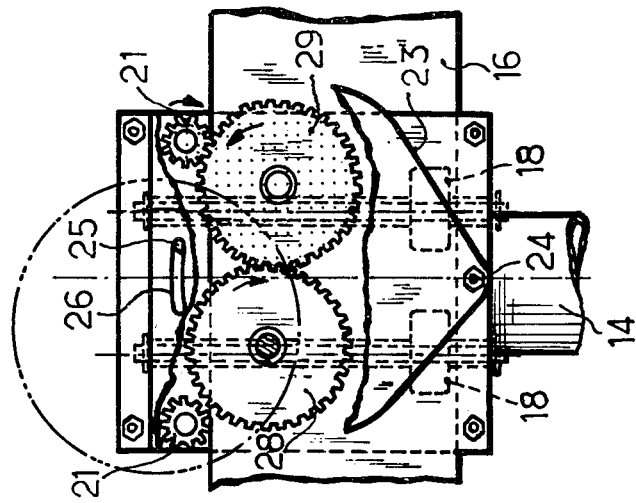

SELF-CLEANING FILTER DEVICE

The present invention relates to and has essentially for its object a self-cleaning filter device, more particularly a filter device constituted by one or several frames of fibrous material cleaned periodically by movable spray means.

The mechanical filter devices in which a gas is to be purified is caused to pass through one or several layers of fibrous material by means of forced ventilation have been in current use for many years. They are particularly well known for their high efficiency in eliminating atmospheric dust from the air absorbed for example by an air conditioning installation. The particular characteristic of such filter devices, however, is the variable resistance which they offer to the passage of the gas, which resistance increases progressively as the impurities accumulate on the superficial layers of the fibrous material. For this reason, automatic periodic-spray cleaning systems have been associated with such filter devices. The cleaning liquid generally used is water with a certain proportion of non-foaming detergent added thereto where appropriate. This on-the-spot cleaning of the filters has important advantages such as considerable labour and time saving. Most of the known devices of this type are provided to that end with a mobile spray pipe integrated to the framework of the filter device, mounted on a traveller adapted to reciprocate along the filter or filters to be cleaned and connected to a cleaning liquid distribution system. Furthermore, the traveller during its movement is supported by a transverse rail support and is generally driven by a more or less complex system of sprockets or wheels and endless chains actuated by an electric motor, the direction of rotation of which, when the traveller reaches the end of its travel at the end of the framework of the filter device, is generally reversed from a circuitry of contactors actuated by the traveller itself. However, the use of an electric motor associated with a direction reversing system of electric contacts is attended by a certain number of drawbacks resulting mainly from the fact that all these electric devices are required to operate in moist air since they must be located in proximity to the spray device. The life of such electric devices is therefore limited and, anyhow, periodic maintenance is necessary to keep the motor and the reversing means in good order, and this, in some cases of particularly difficult installation, may constitute an important obstacle. The present invention is precisely directed at eliminating this drawback.

More precisely, the invention therefore relates to a self-cleaning filter device, of the type including a spray device comprising a spray pipe connected to a system of distribution of a cleaning liquid such as, in particular, water, and a traveller adapted to reciprocate along the filter or filters to be cleaned and supported during its movement by a transverse rail support, the traveller being moved by appropriate traction means; The traction means for the traveller comprises a hydraulic motor inserted in the cleaning liquid distribution system.

Preferably, more particularly where the size of the box-frame of the filter device is not too large, the hydraulic motor is mounted on the traveller itself.

The invention will be better understood and other purposes, details and advantages of the latter will appear more clearly from the following description of a self-cleaning filter device given solely by way of example, with reference to the appended non-limitative drawings wherein:

FIG. 1 is a general perspective view of a self-cleaning box-frame filter device according to the invention;

FIG. 2 is an elevational view of the traveller supporting the spray pipe and mounted in the box-frame of the filter device of FIG. 1 on its guide rail shown in section;

FIG. 3 shows the same traveller seen in the direction of arrow III of FIG. 2; and FIGS. 4 and 5 are partially broken-away views of the traveller of FIG. 3, showing the positions of the gearings in either direction of movement, respectively, of the traveller along the filters to be cleaned.

As appears from the drawings a box-frame filter device according to the invention is made up essentially of a frame 11 in the general shape of a right-angled parallelepiped, the two mutually opposite main faces of which are open to allow air to pass in the direction of arrows F of FIG. 1. Mounted within the frame 11 are several horizontal rows of filter panels 12 constituted by a fibrous material of predetermined thickness. The panels 12 are inclined so as to increase the filtering surface offered by the filter device to the gas passing therethrough. The device is provided with movable spray means 13 adapted to move laterally opposite to the panels 12. The spray means 13 comprise a spray pipe 14a provided with several spray-nozzles 14a directed towards the filtering panels 12. The pipe 14 is arranged substantially vertically and has its upper end attached to a traveller 15 adapted to reciprocate along a rectangular-section rail 16 extending horizontally in the upper portion of the frame 11. The traveller 15 is provided to this end with several loose guide-rollers 18 mounted freely and bearing upon one of the vertical faces of the section rail 16 and with two drive rollers 19 (only one of which is shown in FIG. 2) used alternately to drive the traveller in one direction or the other along the rail 16. To this end, the rollers 19 are rotatably mounted between the bearings 20 of the traveller 15, and gear-wheels 21 are mounted at the end of the shaft of each roller 19, respectively. The wheels 21 are adapted to be driven in rotation alternately and in opposite directions by means which will be described later, thus allowing either roller 19 to fulfil its driving function in the direction assigned to it. To this end, the hydraulic motor 22 is mounted on the traveller 15, more particularly on a pivoting plate 23 of the latter. The plate 23 can therefore pivot about a lower pivot pin 24, its two endmost positions being defined by a stop pin 25 secured to the plate 23 and sliding in a guide slot 26 of the traveller 15. The drive shaft 27 of the motor 22 carries a gear-wheel 28 in mesh with another gear-wheel 29 carried by the pivoting plate 23. Both wheels 28 and 29 have the same pitch diameter. Furthermore, the pivoting amplitude of the plate 23 is adjusted so that in either of its endmost positions one of the wheels 28 or 29 meshes with one of the wheels 21. So, if the direction of the rotation of the wheel 28 is as shown in FIG. 4, it is seen that when the plate 23 is in its left-hand endmost position the left-hand wheel 21 is in mesh with the wheel 28 whereas the other wheel 21 rotates freely, so that the traveller moves towards the left in FIG. 4. If, on the contrary, the plate 23 is in its right-hand position shown in FIG. 5, the wheel 28 transmits its motion to the right-hand wheel 21 through the medium of the wheel 29 (whose speed does not change since it has the same pitch diameter as the wheel 28). The traveller therefore moves to the right. When the traveller 15 reaches one or the other end of the rail 16 the corresponding lateral portion 30 or 31 of the plate 23 engages the edge of the frame 11 thus causing the plate 23 to pivot to its opposite endmost position and so reversing the direction of movement of the traveller 15 in a very simple manner.

Furthermore, the pipe 14 is supplied with cleaning liquid through the medium of a system of distribution of the said liquid comprising a connecting end-piece 35 for connection to a stock of liquid, a rigid conduit portion 36, a flexible conduit portion 37 (allowing for the displacement of the traveller 15), the motor 22 and a conduit element 38 connected between the hydraulic outlet 39 of motor 22 and the inlet 40 of the pipe 14. Otherwise stated, the traction means for the traveller 15, i.e., the hydraulic motor 22, is inserted in the cleaning-liquid distribution circuit. This is an essential characterizing feature of the invention, since it allows any electric device for driving the traveller to be dispensed with. Of course, the mounting of the motor 22 on the traveller 15 is an advantageous feature, but use can be made, as well, of a stationary motor 22 secured to the frame 11 and driving a traveller similar to the traveller 15 through the medium of a chain drive. On the other hand, the above-described reversing system for the traveller 15 is but one example among other possible solutions. The use may also be contemplated of a slide-valve type supply for the hydraulic motor 22 as a means for reversing its direction of rotation, in which case it would be sufficient to connect such slide-valve means to actuating means operated by the traveller 15 at the end of its travel.

The operation of the filter cleaning system is quite simple and can be readily inferred from the foregoing. Periodically, when excessive resistance is offered to the passage of the gas as a result of dust accumulation in the fibrous material, the ventilation is stopped and cleaning liquid is supplied to the spray means 13. The liquid passes through the motor 22, thus causing the traveller 15 to move along the panels 12 while at the same time the cleaning liquid is projected through the spray-nozzles 14a onto the panels 12 to clean the latter in counter-flow relationship, i.e., by traversing them through and through. The cleaning liquid thereafter falls into the lower portion of the frame 11 and is discharged therefrom through the conduit 41 together with the impurities carried by the liquid.

Of course, the invention is by no means limited to the form of embodiment described and illustrated by way of example only, but comprises all the technical equivalents of the means described if the latter are carried out and used within the scope of the following claims.

What is claimed is:

1. A self-cleaning filter device comprising a filter panel supported in a frame;
   spray means extending substantially across the filter-panel including a spray pipe connected to a cleaning liquid distributing system;
   traveller means mounted on a rail support extending substantially across the filter panel, the spray means being supported by the traveller means for movement across the filter panel; and
   drive means for moving the traveller means on the rail support comprising a hydraulic motor inserted in series with the liquid circuit of the cleaning liquid distributing system whereby the traveller means moves on the rail support, due to the cleaning liquid passing through the hydraulic motor.

2. A filter device according to claim 1, wherein the hydraulic motor is stationary and drives the traveller through a chain drive or a rack-gear drive.

3. A filter device according to claim 1, wherein the hydraulic motor is mounted on the traveller means.

4. A filter device according to claim 3 wherein the traveller means comprises a pivoting plate supporting the hydraulic motor, the plate having two extreme positions of pivot;
   two gear means in mesh engagement with one another and supported by the plate, one of the gear means being secured to a shaft of the hydraulic motor;
   a further gear means mounted to means for moving the traveller means on the rail support, each of the two gears means being in mesh engagement with the further gear means in respective pivot extreme positions of the plate; and
   means for pivoting the plate at each extreme position to reverse the direction of movement of the traveller means.

5. A filter device according to claim 4 wherein the reversing means includes a stop pin extending through a slot in the plate.

6. A filter device according to claim 4 wherein the reversing means comprises a lateral portion of the plate engaging the frame and pivoting the plate.

* * * * *